United States Patent [19]
Arakawa

[11] Patent Number: 5,430,853
[45] Date of Patent: Jul. 4, 1995

[54] UPDATE OF CONTROL PARAMETERS OF A DIRECT MEMORY ACCESS SYSTEM WITHOUT USE OF ASSOCIATED PROCESSOR

[75] Inventor: Tadashi Arakawa, Machida, Japan

[73] Assignee: Canon Kabushiki Kaisha, Tokyo, Japan

[21] Appl. No.: 29,068

[22] Filed: Mar. 10, 1993

Related U.S. Application Data

[63] Continuation of Ser. No. 644,751, Jan. 23, 1991, abandoned, which is a continuation of Ser. No. 159,204, Feb. 23, 1988, abandoned.

[30] Foreign Application Priority Data

Feb. 26, 1987 [JP] Japan ................................. 62-041536
May 26, 1987 [JP] Japan ................................. 62-127144
May 26, 1987 [JP] Japan ................................. 62-127145

[51] Int. Cl.⁶ ..................... G06F 13/00; G06F 13/28
[52] U.S. Cl. ................................. 395/275; 395/425; 364/DIG. 1
[58] Field of Search .................. 395/425, 375, 275, 525

[56] References Cited

U.S. PATENT DOCUMENTS

| | | | |
|---|---|---|---|
| 4,479,179 | 10/1984 | Dinwiddie, Jr. | 395/425 |
| 4,481,578 | 11/1984 | Hughes et al. | 395/425 |
| 4,503,496 | 3/1985 | Holzner et al. | 395/425 |
| 4,590,468 | 5/1986 | Stieglitz | 364/200 |
| 4,651,277 | 3/1987 | Sakaji | 395/425 |
| 4,807,112 | 2/1989 | Hamasaki | 395/425 |

Primary Examiner—Jack B. Harvey
Assistant Examiner—Michael A. Whitfield
Attorney, Agent, or Firm—Fitzpatrick, Cella, Harper & Scinto

[57] ABSTRACT

A DMA transfer control system includes a DMA control unit connected to a bus shared by a CPU; a storage device for receiving and storing various parameters of the DMA control unit via the CPU; an addressing unit for outputting an address of the various parameters to be set at the DMA control unit; and a circuit for outputting the various parameters from the storage device to the DMA control unit in synchronism with a reference clock of the CPU.

8 Claims, 12 Drawing Sheets

UPDATE OF CONTROL PARAMETERS OF A DIRECT MEMORY ACCESS SYSTEM WITHOUT USE OF ASSOCIATED PROCESSOR

This application is a continuation of application Ser. No. 07/644,751 filed Jan. 23, 1991, now abandoned, which is a continuation of application Ser. No. 07/159,204 filed Feb. 23, 1988, now abandoned.

BACKGROUND OF THE INVENTION

Field of the Invention

The present invention relates to a direct memory access (DMA) system for data transfer in a communication apparatus for example.

Related Background Art

In a conventional DMA transfer in a communication apparatus for example, various parameters are set at a DMA controller (DMAC) under the control of a CPU such as a microprocessor, and upon instruction of starting a DMA transfer, data are transferred between a transmitter/receiver buffer and a memory. Particularly, upon reception of one word communication data for example, a DMA data transfer request is issued for transferring data from the reception buffer to the memory. The DMAC then requests to use the system bus to and cause for transferring the received one word data to the memory by means of, for example, a cycle steal method. By repeating such DMA transfer operation, communication data of plural words are transferred to the memory. After completion of transferring communication data of one frame length, an end of one frame reception is notified to the CPU which resets various parameters of the DMAC for preparation of receiving the next frame.

Accordingly, it becomes necessary for the CPU to execute at least the following steps during the time from the one frame reception end to the next frame reception start.

Step 1: task change after responding to interruption
Step 2: secure memory areas for receiving next frame
Step 3: resetting internal registers of DMAC However, since these steps are executed under program control, it takes much time. Particularly at step 2, it becomes necessary to use an additional task for supervising the memory areas themselves. This means that a sufficient marginal time must be given to the overall operation of steps 1 to 3 in designing the communication system. Thus, the reception capability of the communication system, i.e., the capability of reliably receiving and processing high speed consecutive frames, has been restricted in some degree.

SUMMARY OF THE INVENTION

In view of the above-described prior art problems, it is an object of the present invention to provide a DMA transfer control system capable of resetting various parameters of a DMAC at high speed without using program control by a CPU.

It is another object of the present invention to provide a DMA control system capable of resetting various parameters of the DMAC at high speed and inhibiting the next DMA transfer until the various parameters have been reset.

It is a further object of the present invention to provide a data transfer apparatus capable of resetting various parameters of the DMAC at high speed and inhibiting the next DMA transfer until the various parameters have been reset, to thereby ensure a reliable high speed DMA data transfer.

DETAILED DESCRIPTION OF THE PREFERRED EMBODIMENT

A preferred embodiment of this invention will now be described in detail with reference to the accompanying drawings.

[Description of Communication Apparatus (FIG. 2)]

Figure 2:
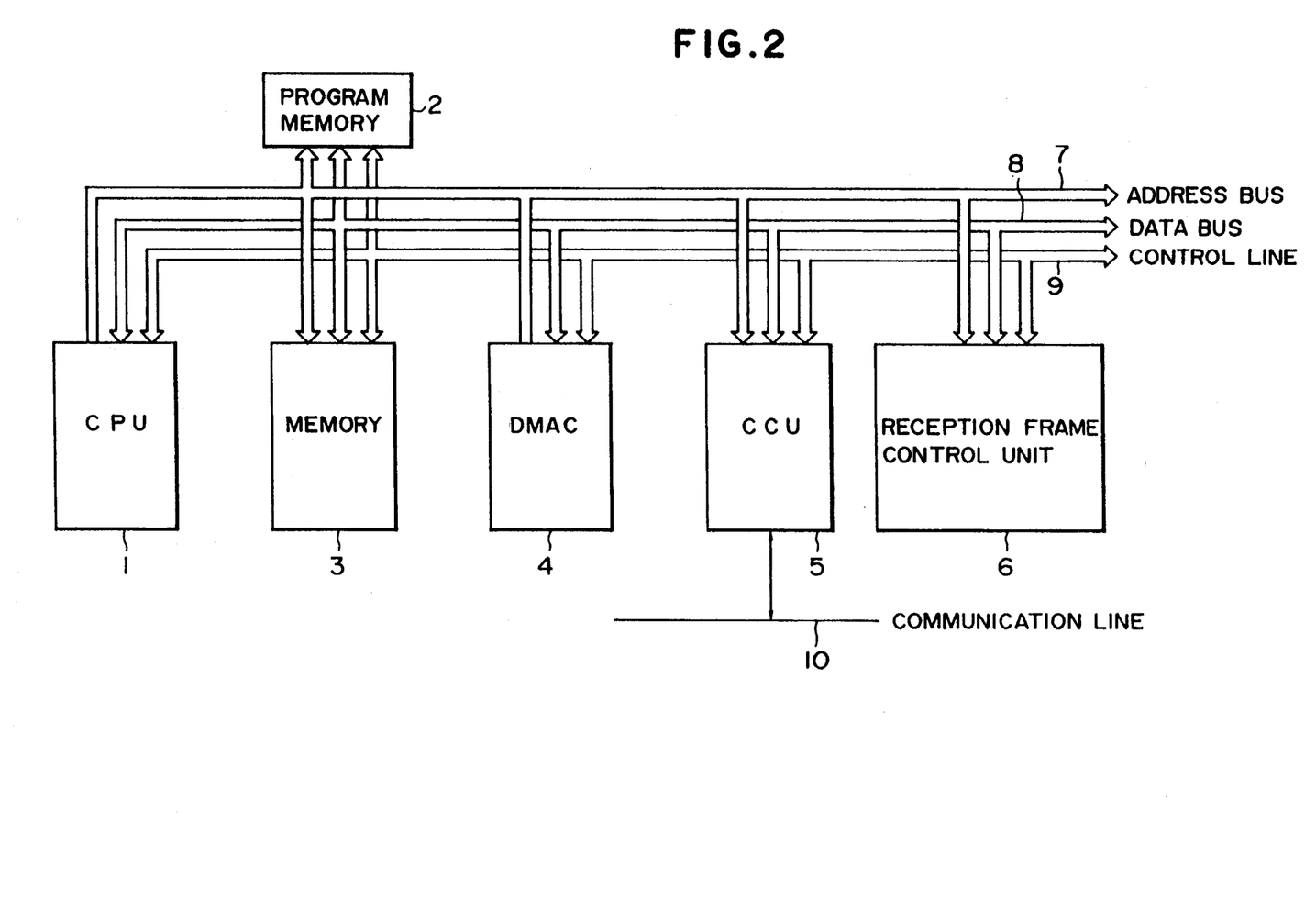
FIG. 2 is a block diagram showing the outline of a communication apparatus according to an embodiment of the present invention.

FIG. 2 is a block diagram showing the outline of a communication apparatus of the embodiment.

Referring to FIG. 2, a CPU 1 such as an 8 bit microprocessor controls the operation of the apparatus by performing various arithmetic/logical operations and various control signal input/output operations, in accordance with control programs and data stored in a program memory 2. A memory 3 stores reception/transmission data. A DMAC 4 controls a DMA transfer between the memory 3 and a communication control unit (CCU) 5 in accordance with parameters set at the DMAC.

CCU 5 is connected to a communication line 10 to support hierarchic functions lower than CCITT Recommendation X.25 Level 2, the lower hierarchic functions particularly including flag synchronization, time fill, zero insertion/deletion and the like for frames of the High Level Data Link Control (HDLC). A reception frame control unit 6 sets various parameters of DMAC 4 as described later in detail with reference to FIG. 1. These elements 1 to 6 are interconnected to each other by an address bus 7, 8 bit data bus 8 and control line 9 (these are collectively called a system bus hereinafter). The control line herein used includes all control lines such as read/write lines for controlling the operation of the elements 1 to 6, a clock signal line and a bus request signal line.

With the apparatus constructed as above, CCU 5 performs DMA transfer of one byte to and from the memory 3 via the bus, and performs HDLC frame data transmission/reception to and from the communication line 10 via an X.21 interface for example. A channel used by CCU 5 for DMA transfer of received data from the communication line 10 to the memory 3 is called a reception DMA channel which is controlled by internal registers of DMAC 4. At least two internal registers are required in this case, one being a 16 bit reception address register (RxADR) for storing a destination memory address of received data, and the other being a 16 bit reception byte count register (RxBCR) for storing a maximum length of a received frame.

[Description of Reception Frame Control Unit (FIG. 1)]

Figure 1:
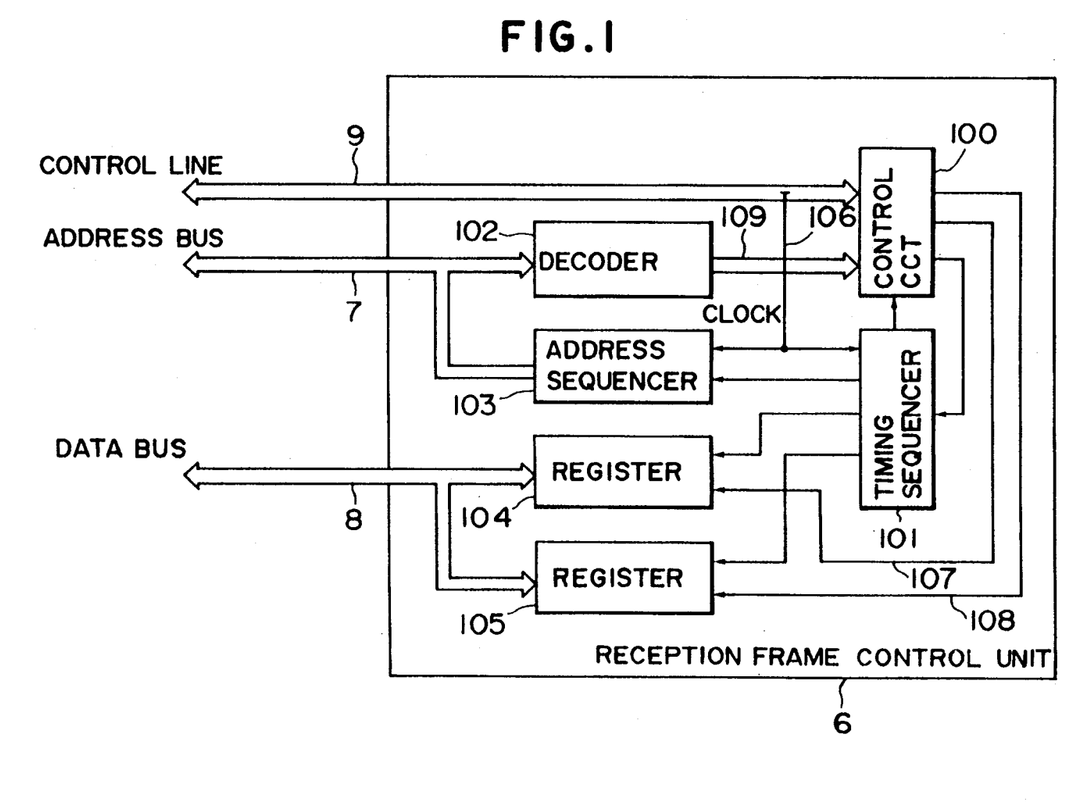
FIG. 1 is a block diagram showing the outline of a reception frame control unit according to an embodiment of the present invention.

FIG. 1 is a block diagram showing the structure of the reception frame control unit of this embodiment.

A control circuit 100 controls the reception frame control unit 6. The control circuit 100 requests the system bus by outputting a bus request signal (BUSRQ) when detecting a reception and from the control line 9, and it outputs a write signal 107 or 108 to a register 104 or 105 when receiving a control signal from CPU 1 and an address decode signal 109 from a decoder 102. As a result, various parameters from CPU 1 are set to the register identified by the address decode signal 109. The decoder 102 receives a lower bit address of a 16 bit address data from the address bus 7 to decode it and output the address decode signal 109.

An output of an address sequencer 103 is connected to the address bus 7 via a tri-state output buffer. The address sequencer 103 receives a reference clock 106 of CPU 1 as its sequence clock to output particular address data to the address bus 7. It is in this embodiment that this particular address data is fixedly set.

The registers 104 and 105 each are constructed of 16 bits using two 8 bit registers, and are connected to the data bus 8 via tri-state I/O buffers. The four 8 bit registers are selected in accordance with the address decode signal 109 from the decoder 102. A timing sequencer 101 receives the reference clock 106 to control the output timings of the four 8 bit registers and address data from the address sequencer 103.

With the above-described circuit arrangement, various parameters from CPU 1 are written in each data having 8 bits register of the registers 104 and 105. Eight bits in each register are then written in the internal registers of DMAC 4 during one clock cycle of the main clock 109.

[Description of Operation (FIGS. 3 to 6)]

Figure 3:
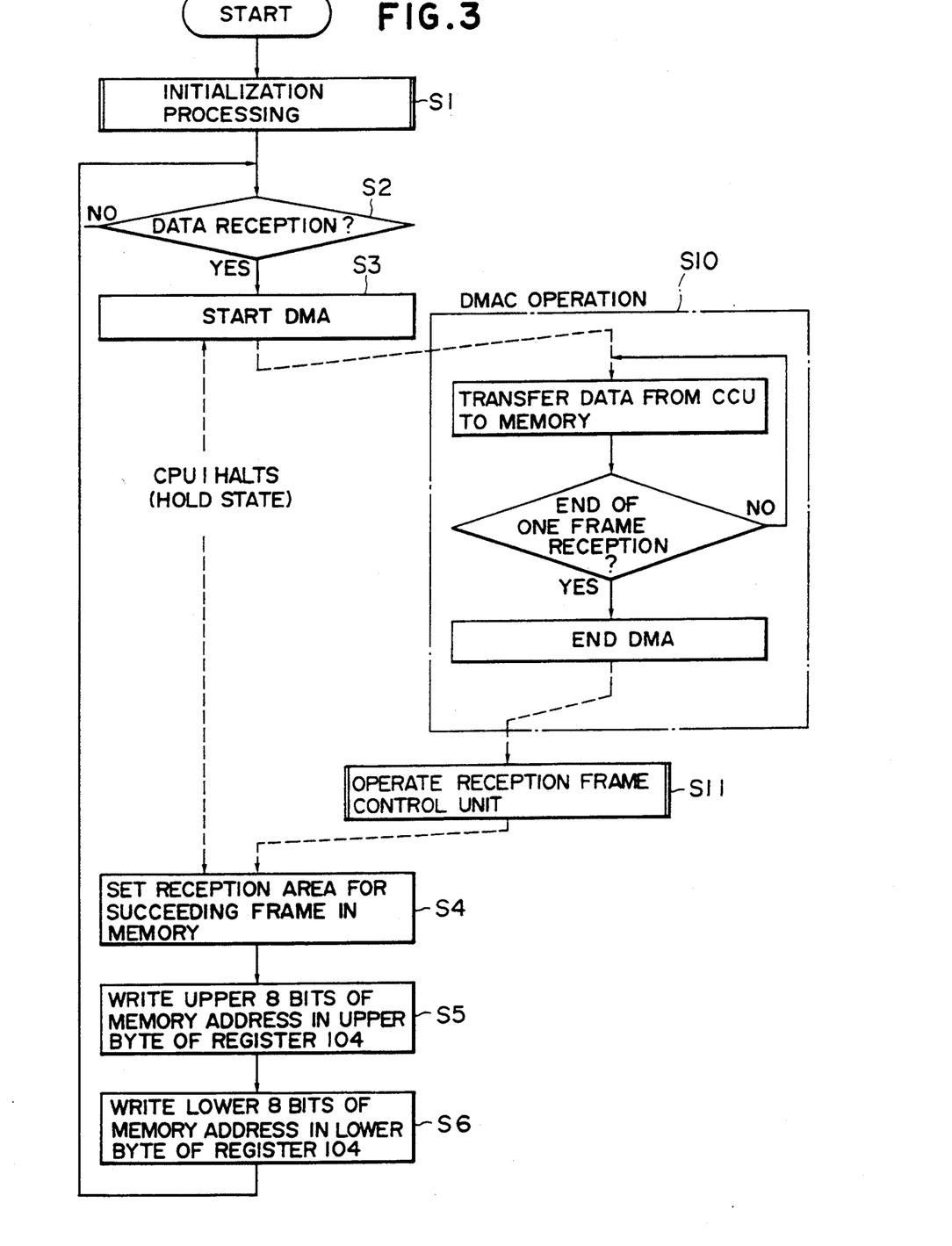
FIG. 3 is a flow chart illustrating a reception control by a CPU.

FIG. 3 is a flow chart illustrating a data reception processing by CPU 1 using a control program stored in the program memory 2.

Figure 4:
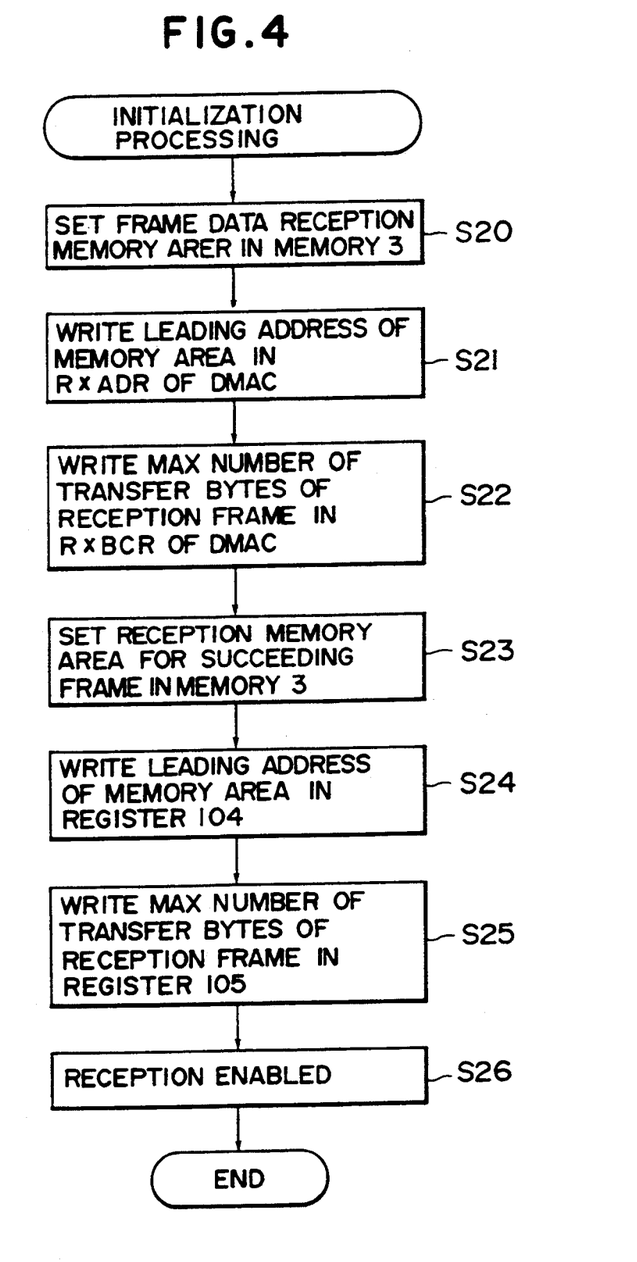
FIG. 4 is a flow chart illustrating an initialization processing by the CPU.

The control program starts when the apparatus is turned on. First, at step S1, an initialization processing shown in FIG. 4 is performed. If there occurs a data reception at step S2, the flow advances to step S3 whereat DMAC 4 is instructed to start a DMA operation. A DMA operation by DMAC 4 may be arranged to start automatically upon instruction from CCU 5.

At the start of the DMA operation, a bus master of the system bus is assigned from CPU 1 to DMAC 4 (step S10). At step S10, received data at CCU 5 are repeatedly DMA transferred to the memory 3, one byte after another until one frame data have been transferred thereto. The DMA operation terminates after one frame data has been transferred.

Figure 5:
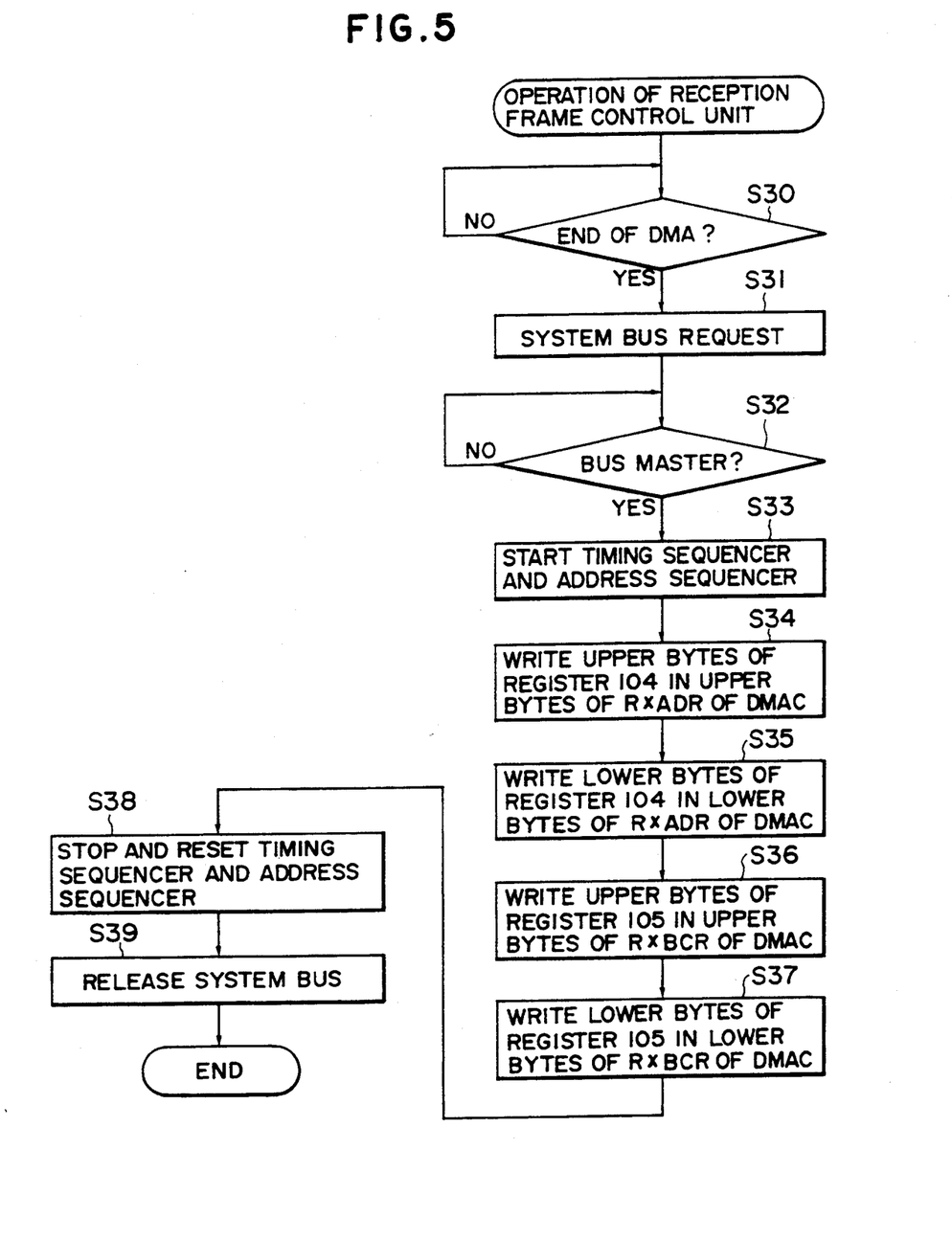
FIG. 5 is a flow chart illustrating the operation of setting parameters of a DMAC by the reception frame control unit.

Step S11 represents the operation of the reception frame control unit after the end of one frame data reception, the step being detailed in FIG. 5.

After steps S10 and S11, CPU 1 becomes again a bus master to thereby assign the system control to CPU 1 at step S4. At step S4, the reception area of succeeding frame is set in the memory 3. The upper 8 bits of the leading address of the reception area set in the memory 3 are written in the upper byte of the register 104 at step S5, while the lower 8 bits thereof are written in the lower byte of the register 104. Thereafter, the flow returns to step S2 to repeat the above operations when data are received.

In the flow chart, the number of data of one frame has been fixed and the maximum number of transfer bytes of a received frame is not subjected to change at steps following Step S4. However, it is obvious that a step for changing the data in the register 105 may be added if the maximum number of data in one frame varies.

FIG. 4 is a flow chart illustrating the initialization processing by CPU 1.

At step S20, one frame data receiving area is set in the memory 3. At step S21, the leading address of the memory area set at step S20 is written in the reception address register RxADR of DMAC 4. At step S22, the maximum number of transfer bytes of a reception frame is written in the reception byte count register RxBCR of DMAC 4. At step S23, a next frame data receiving area is set in the memory 3. At step S24, the leading address of the memory area set at step S23 is written in the register 104. At step S25, the maximum number of transfer bytes of a reception frame is written in the register 105.

[Description of Operation of Reception Frame Control Unit (FIGS. 5 and 6)]

FIG. 5 is a flow chart illustrating parameter settings to DMAC, by the control circuit 100 and timing sequencer 101 and address sequencer 103 of the reception frame control unit 6.

If an end of DMA transfer is detected at step S30, the flow advances to step S31 whereat a bus request signal is output to render DMAC 4 as a bus master of the system bus. When DMAC 4 is allowed to be a bus master upon acknowledgement of the bus request, the flow advances to step S33 whereat the timing sequencer 101 and address sequencer 103 are activated. The upper byte in the register 104 is written in the upper byte of the reception address register RxADR or DMAC 4 at step S34, while the lower byte in the register 104 is written in the lower byte of RxADR of DMAC 4 at step S35.

Next at steps S36 and S37, the upper and lower bytes of the register 105 are written in the reception byte count register RxBCR of DMAC 4. These write operations each are carried out during one clock cycle of the reference clock 106.

At step S38, the operations of the timing sequencer 101 and the address sequencer 103 are stopped. At step S39, use of the system bus is abandoned by DMAC 4 to terminate the processing.

Figure 6:
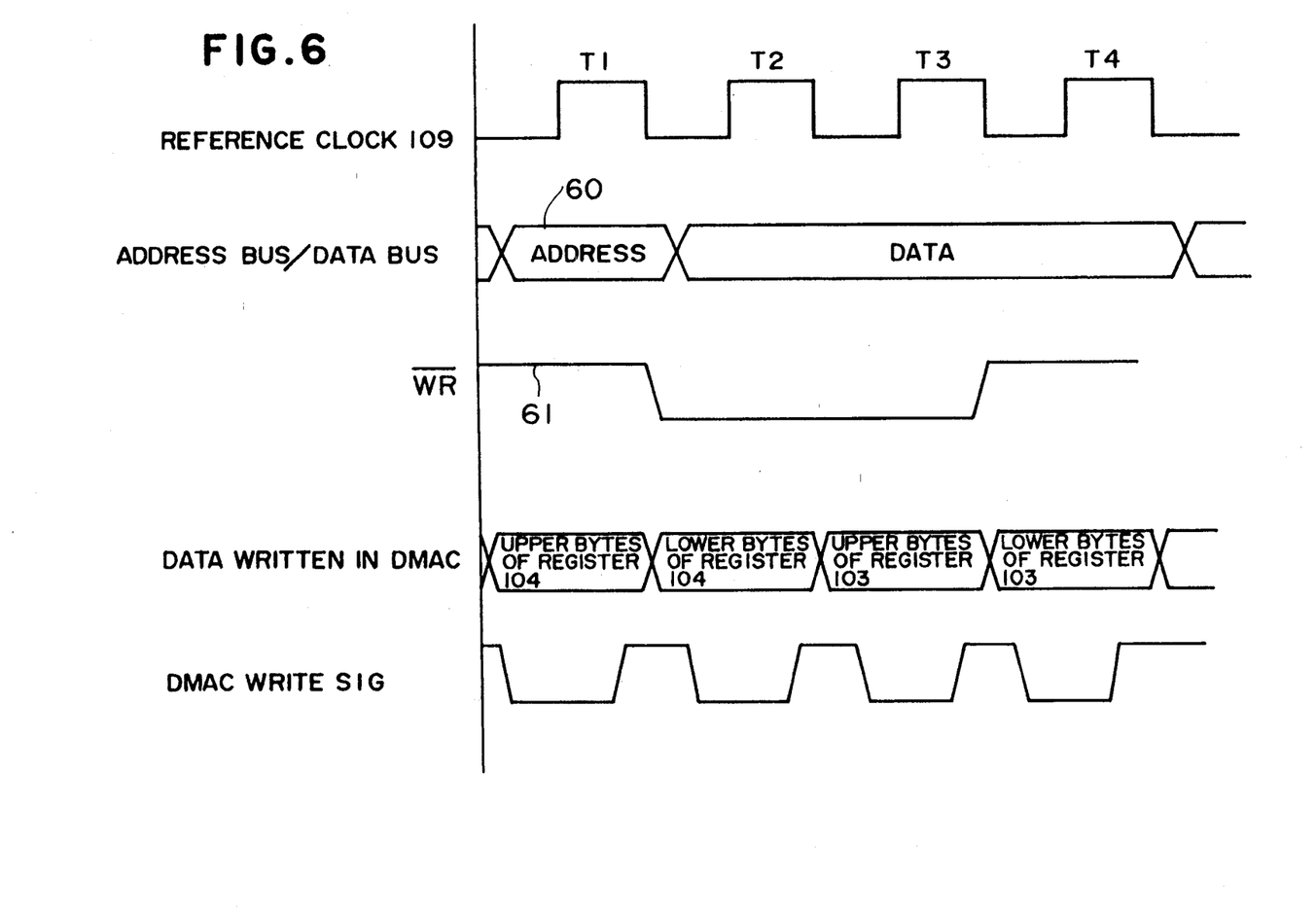
FIG. 6 is a timing chart illustrating write timings to the DMAC relative to the CPU operation.

FIG. 6 is a timing chart showing the operation of the reception frame control unit relative to that of CPU 1. A waveform 60 represents the basic timings of the address bus and the data bus, and a waveform 61 represents a write signal ($\overline{WR}$) output from CPU 1. As seen from the timing chart, in case of a conventional microprocessor, even if data to be written are set in the accumulator, it takes at least four cycle time of the reference clock 109 (for an I/O write instruction) to write the data into each register of DMAC 4.

In contrast, in case of this embodiment, writing data of four bytes into DMAC 4 takes four clock cycle time of the reference clock 109, thus enabling to set parameters of DMAC 4 at high speed.

Although setting data in the internal registers RxADR and RxBCR of DMAC 4 has been described in the present embodiment, the invention is not limited thereto, but virtual registers may be provided in the reception frame control unit 6 for all the internal write-enabled registers of DMAC 4 to effect writing data into the respective registers. For example, if a virtual register of an internal register of DMAC 4 for allowing/inhibiting DMA transfer is provided, it becomes possible to inhibit DMA transfer immediately after receiving a frame reception end from the system.

Further, DMA transfer for a communication apparatus has been described. However, the invention is not limited thereto, but it is also applicable to DMA transfer between a memory and an I/O unit of another apparatus.

As described so far, the present embodiment allows the preparation of DMA transfer high speed so that high speed consecutive communication frames can be reliably received. (Embodiment)

Another preferred embodiment of this invention will now be described detail with reference to the accompanying drawings.

[Description of Communication Apparatus (FIG. 8)]

Figure 8:
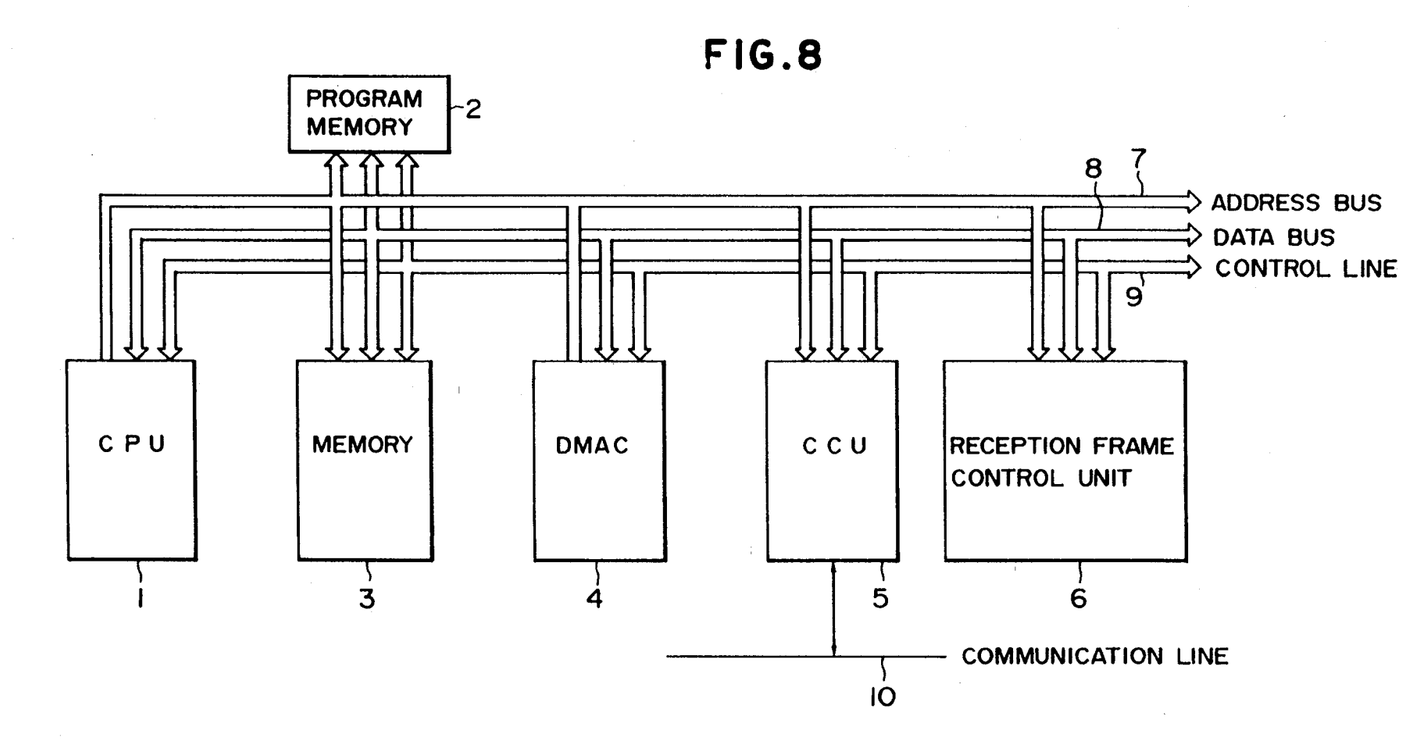
FIG. 8 is a block diagram showing the outline of a communication apparatus according to another embodiment of the present invention.

FIG. 8 is a block diagram showing the outline of a communication apparatus of the embodiment.

Referring to FIG. 8, a CPU 1 such as an 8 bit microprocessor controls the operation of the apparatus by performing various arithmetic/logical operations and various control signal input/output operations, in accordance with control programs and data stored in a program memory 2. A memory 3 stores reception/transmission data. A DMAC 4 controls a DMA transfer between the memory 3 and a communication control unit (CCU) 5 in accordance with parameters set at the DMAC. CCU 5 is connected to a communication line 10 to support hierarchic functions lower than CCITT Recommendation X.25 Level 2, the lower hierarchic functions particularly including flag synchronization, time fill, zero insertion/deletion and the like for frames of the High level Data Link Control (HDLC).

A reception frame control unit 6 sets various parameters of DMAC 4 as described later in detail with reference to FIG. 7. These elements 1 to 6 are interconnected to each other by an address bus 7, 8 bit data bus 8 and control line 9 (these are collectively called a system bus hereinafter). The control line herein used includes all control lines such as read/write lines for controlling the operation of the elements 1 to 6, clock signal line and bus request signal line.

With the apparatus constructed as above, DMA transfer between CCU 5 and the memory 3 is performed under control of DMAC 4 via the system bus, and CCU 5 performs HDLC frame data transmission/reception to and from the communication line 10 via an X.21 interface for example. A channel used by CCU 5 for DMA transfer of received data from the communication line 10 to the memory 3 is called a reception DMA channel which is controlled by internal registers of DMAC 4. At least two internal registers are required in this case, one being a 16 bit reception address register (RxADR) for storing a destination memory address of received data, and the other being a 16 bit reception byte count register (RxBCR) for storing a maximum length of a received frame.

[Description of Reception Frame Control Unit (FIG. 7)]

Figure 7:
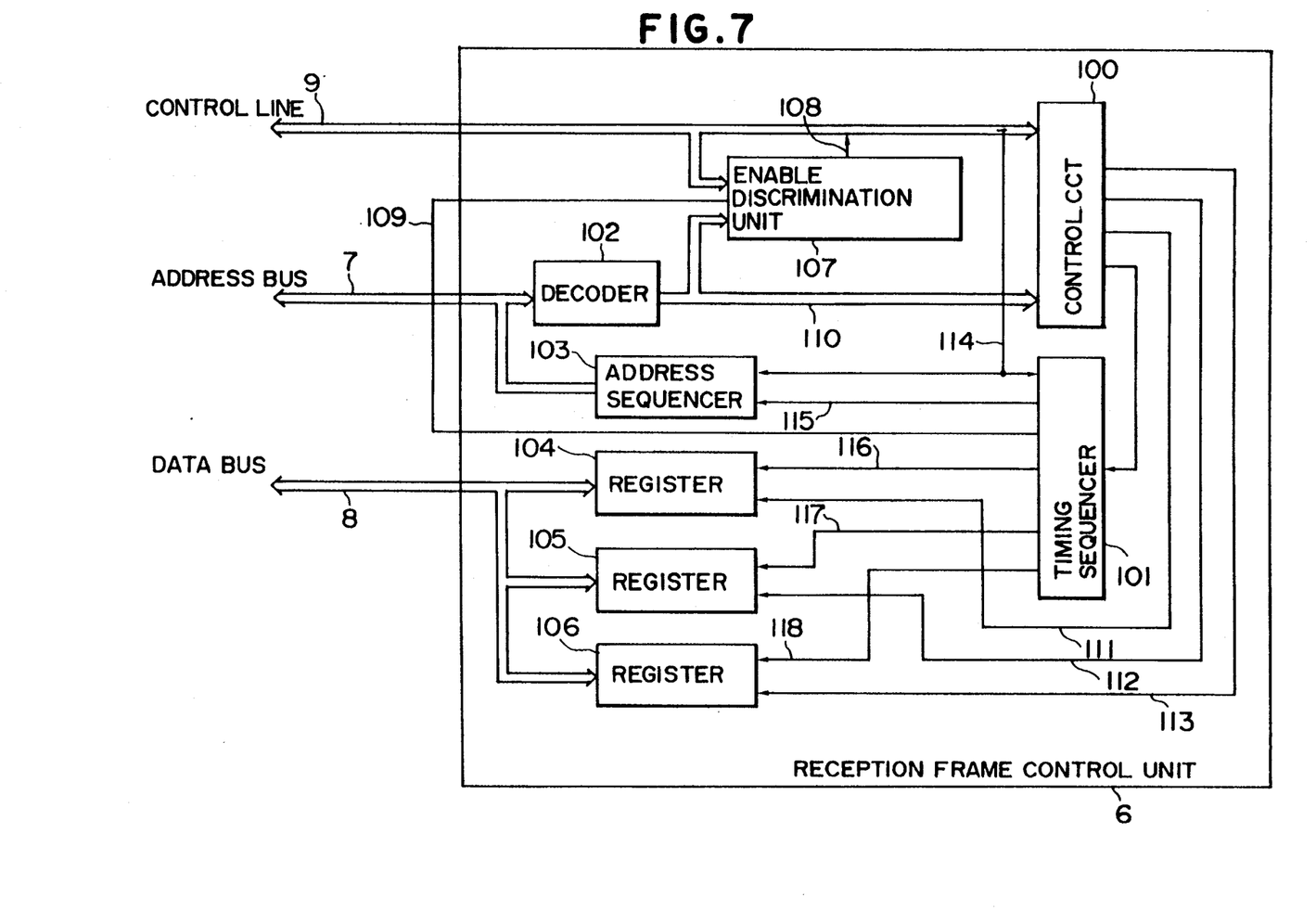
FIG. 7 is a block diagram showing the outline of a reception frame control unit according to another embodiment of a present invention.

FIG. 7 is a block diagram showing the structure of the reception frame control unit of this embodiment.

A control circuit 100 controls the reception frame control unit 6. The control circuit 100 requests the bus by outputting a bus request signal (BUSRQ) to the control bus 9 when detecting a reception end from CCU 5, and it checks the operation status of CPU 1 and outputs a write signal 111 or 112 to a register 104 or 105 in synchronism with the operation of CPU 1 when receiving a control signal from CPU 1 and an address decode signal 110 from a decoder 102. As a result, various parameters from CPU 1 are set to the register identified by the address decode signal 110. A read signal 113 is supplied to a register 106 in synchronism with a read timing for RxBCR of DMAC 4. The decoder 102 outputs the address decode signal 110.

An output of an address sequencer 103 is connected to the address bus 7 via a tri-state output buffer. The address sequencer 103 receives a reference clock 114 of CPU 1 as its sequence clock to sequentially output particular address data (device address of DMAC 4) to the address bus 7.

The registers 104 to 106 each are constructed of 16 bits using two 8 bit registers, and are connected to the data bus 8 via tri-state I/O buffers. The six 8 bit registers are selected in accordance with the address decode signal 110 from the decoder 102. A timing sequencer 101 receives the reference clock 114 and a signal 119 from the control circuit 100 to output timing signals 115 to 118 for controlling the output timings of the six 8 bit registers 104 to 106 and address data from the address sequencer 103.

With the above-described circuit arrangement, various parameters from CPU 1 are written in each 8 bit register of the registers 104 and 105. 8 bit data in each register are then written in the associated internal registers of DMAC 4 during one clock cycle of the reference clock 114, or alternatively the data in the internal registers of DMAC 4 are read therefrom to the register 106.

An enable discrimination unit 107 receives the address decode signal 110 from the decoder 102, a control signal from the control line 9 and a disenable signal 109 from the timing sequencer 101, to thereby output an enable signal 108 to the control line 9. After CPU 1 performs a write operation to the register 104, the enable discrimination unit 107 checks the address signal of the register 104 and the write signal on the control line 9, to make the enable signal 108 active when the upper byte (or lower byte) has been written and make it inactive when the lower byte (or upper byte) has been written thereafter.

After completion of writing data into DMAC 4, the timing sequencer 101 outputs the disenable signal 109 to make inactive the enable signal 108 from the enable discrimination unit 107. The enable signal also functions as a status signal of the reception frame control unit 6.

An inactive enable signal indicates that the operation of the reception frame control unit is being inhibited.

[Description of Operation (FIGS. 9 to 12)]

Figure 9:
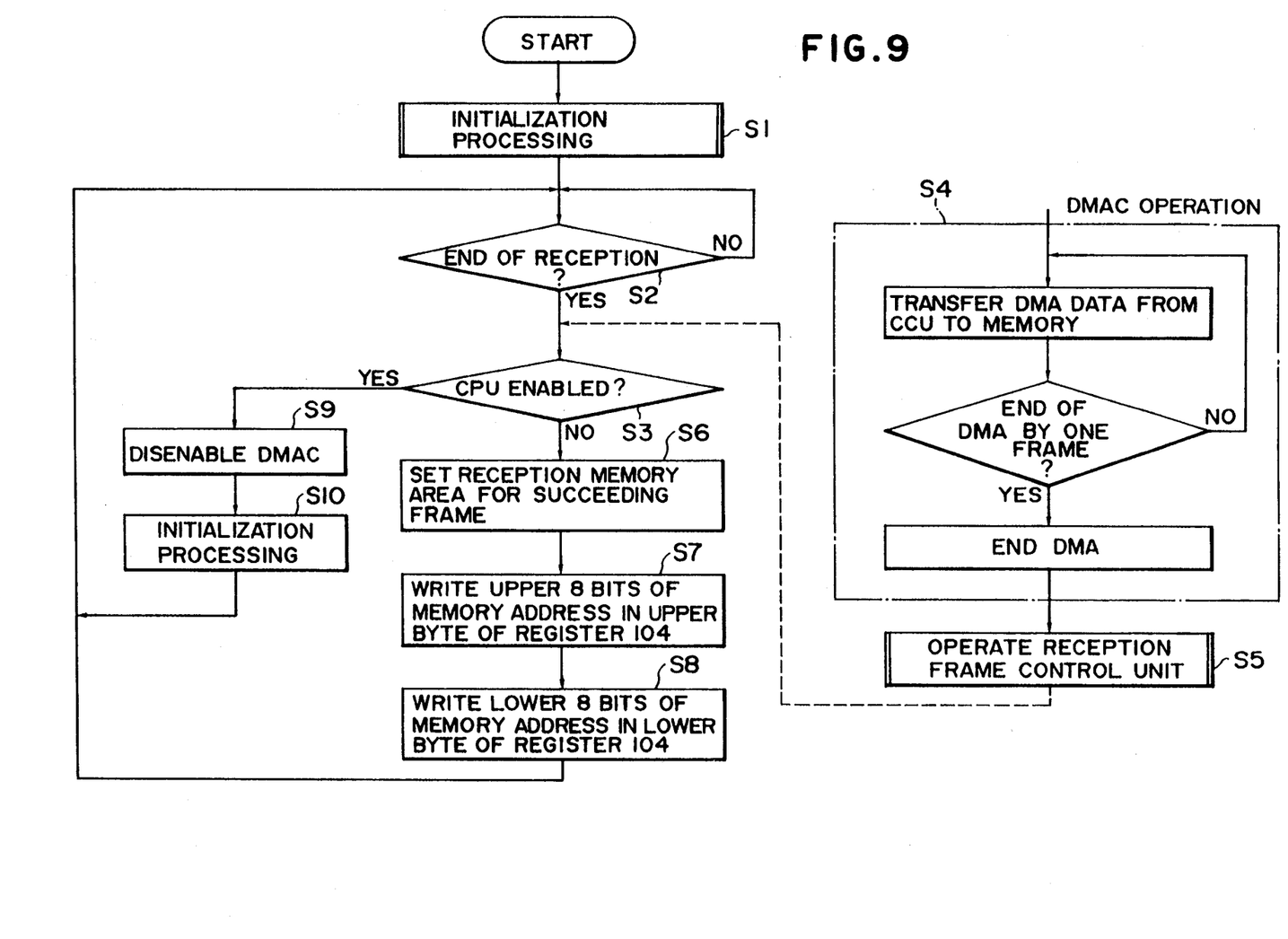
FIG. 9 is a flow chart illustrating a DMA transfer processing of frame data by a CPU.

FIG. 9 is a flow chart illustrating a data reception processing by CPU 1 using a control program stored in the program memory 2.

Figure 10:
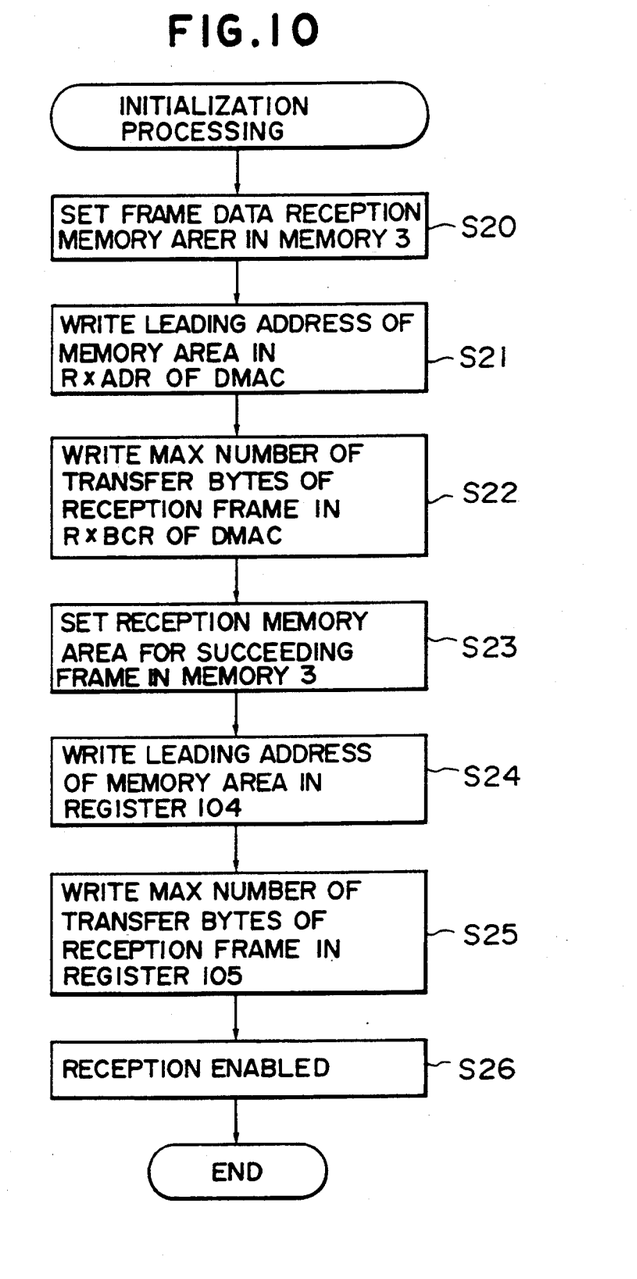
FIG. 10 is a flow chart illustrating an initialization processing by the CPU.

The control program starts when the apparatus is turned on. First, at step S1, an initialization processing shown in FIG. 10 is performed. A notice of an end of one frame data transfer from CCU 5 is waited for at step S2. This notice is conducted usually by an interruption signal.

At the start of the DMA operation, a bus master of the system bus is assigned from CPU 1 to DMAC 4 (step S4). At step S4, received data at CCU 5 are repeatedly DMA transferred to the memory 3 one byte after another until one frame data have been transferred thereto. The DMA operation terminates after one frame data has been transferred.

Figure 11:
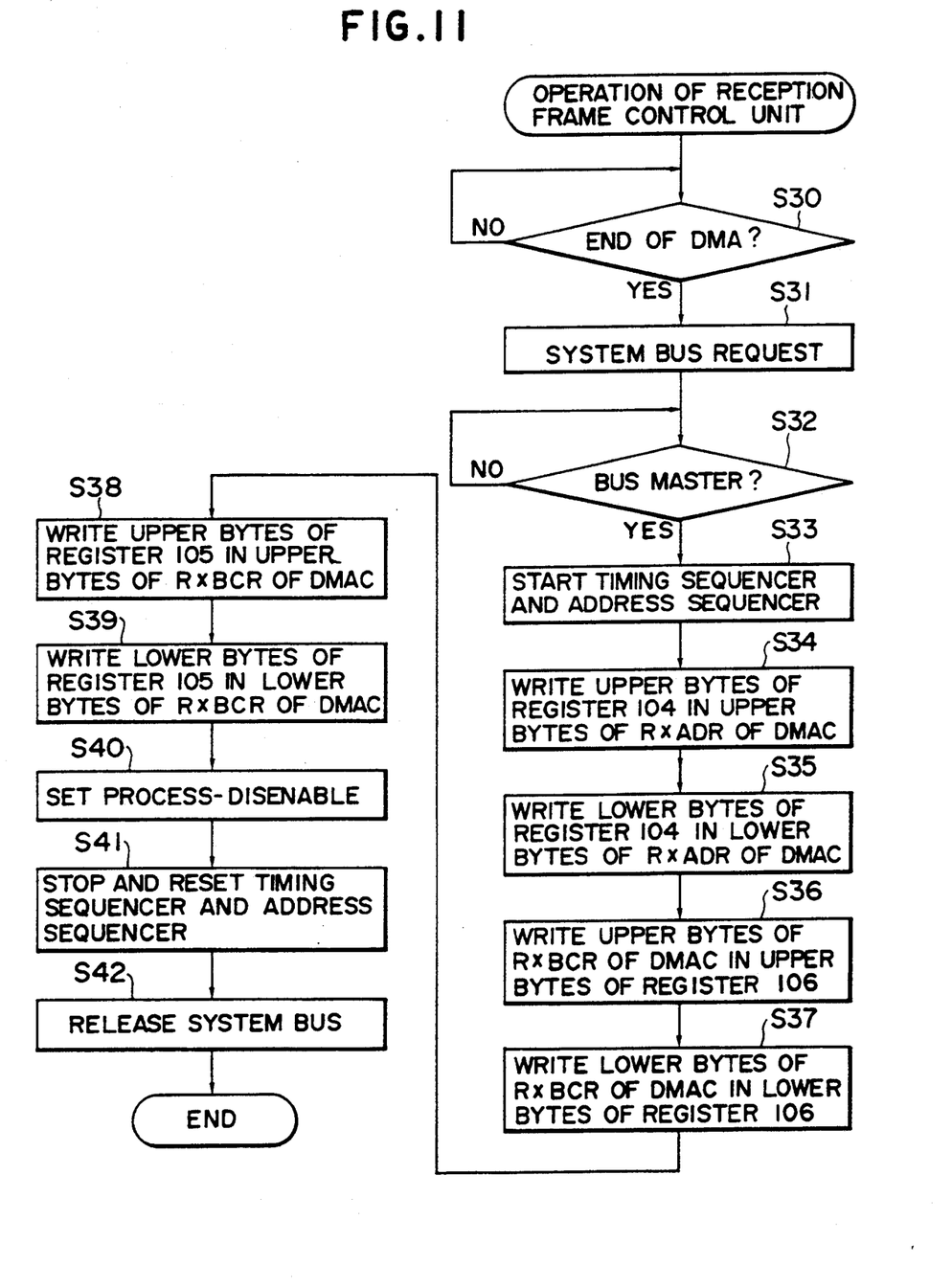
FIG. 11 is a flow chart illustrating the operation of setting parameters of a DMAC by the reception frame control unit.

Step S5 represents the operation of the reception frame control unit 6 after the end of one frame data reception, the step being detailed in FIG. 11. Resetting the registers of DMAC 4 is completed by this processing and the re-execution of this step S5 is inhibited.

After completion of DMA transfer, CPU 1 again becomes a bus master at step S3 and checks the enable signal 108. If the enable signal 108 is inactive, renewing the register 104 starts in order to receive the next frame, and the reception area for the next frame is set in the memory 3 at step S6. The upper 8 bits of the leading address of the reception area set in the memory 3 are written in the upper byte of the register 104 at step S7, while the lower 8 bits thereof are written in the lower byte of the register 104. Then, the enable discrimination unit 107 makes the enable signal 108 active so that execution at step S5 at the end of next frame reception is enabled. Thereafter, the flow returns to step S2 and repeatedly executes the above operations after the end of the next frame data reception.

If the enable signal is active at step S3, it means that step S5 has not been executed. Thus, CPU 1 disenables DMAC 4 at step S9 and thereafter, an initialization processing is executed at step S10 to then return to step S2.

In the flow chart, the number of data of one frame has been fixed and the maximum number of transfer bytes of a received frame is not subjected to change at steps following step S2. However, it is obvious that a step for changing the data in the register 105 may be added if the maximum number of data in one frame varies.

By so arranging the flow, step S5 is executed after renewal of parameters of the register 104 so that the next DMA operation is not allowed to be performed without renewing the parameters in DMAC 4.

FIG. 10 is a flow chart illustrating the initialization processing by CPU 1.

At step S20, one frame data receiving area is set in the memory 3. At step S21, the leading address of the memory area set at step S20 is written in the reception address register RxADR of DMAC 4. At step S22, the maximum number of transfer bytes of a reception frame is written in the reception byte count register RxBCR of DMAC 4. At step S23, a next frame data receiving area is set in the memory 3. At step S24, the leading address of the memory area set at step S23 is written in the register 104. At step S25, the maximum number of transfer bytes of a reception frame is written in the register 105. At step S26, CCU 5 and DMAC 4 are enabled to complete the initialization processing.

[Description of Operation of Reception Frame Control Unit (FIGS. 11 and 12)]

FIG. 11 is a flow chart illustrating parameter settings to DMAC, by the control circuit 100 and timing sequencer 101 and address sequencer 103 of the reception frame control unit 6.

If an end of one frame DMA transfer is detected at step S30, the flow advances to step S31 whereat a bus request signal is output to the control line 9 to render DMAC 4 as a bus master of the system bus. When DMAC 4 is allowed to be a bus master upon acknowledgement of the bus request, the flow advances to step S33 whereat the timing sequencer 101 and address sequencer 103 are activated. The upper byte in the register 104 is written in the upper byte of the reception address register RxADR or DMAC 4 at step S34, while the lower byte in the register 104 is written in the lower byte of RxADR of DMAC 4 at step S35.

Next, the value in the RxBCR register of DMAC 4 is written in the upper byte of the register 106, while the lower byte in the RxBCR register is written in the lower byte of the register 106 at step S37. It then becomes possible for CPU 1 to calculate an actual number of written bytes (words). For example, the leading address of the next memory area may be obtained by adding the previous leading address of the memory to the number of words, to use it in step S6 of the flow chart shown in FIG. 9 for setting a reception memory area.

Next, at steps S38 and S39, the upper and lower bytes of the register 105 are written in the reception byte count register RxBCR of DMAC 4.

It is to be noted that writing and reading operations to and from DMAC 4 are sequentially executed during one clock cycle of the reference clock 114.

At step S40, the disenable signal 109 is output from the timing sequencer 101 to the enable discrimination unit 107 to make the enable signal 108 of the enable discrimination unit 107 inactive. At step S41, the operations of the timing sequencer 101 and the address sequencer 103 are stopped. At step S42, use of the system bus is abandoned by DMAC 4 to terminate the processing.

Figure 12:
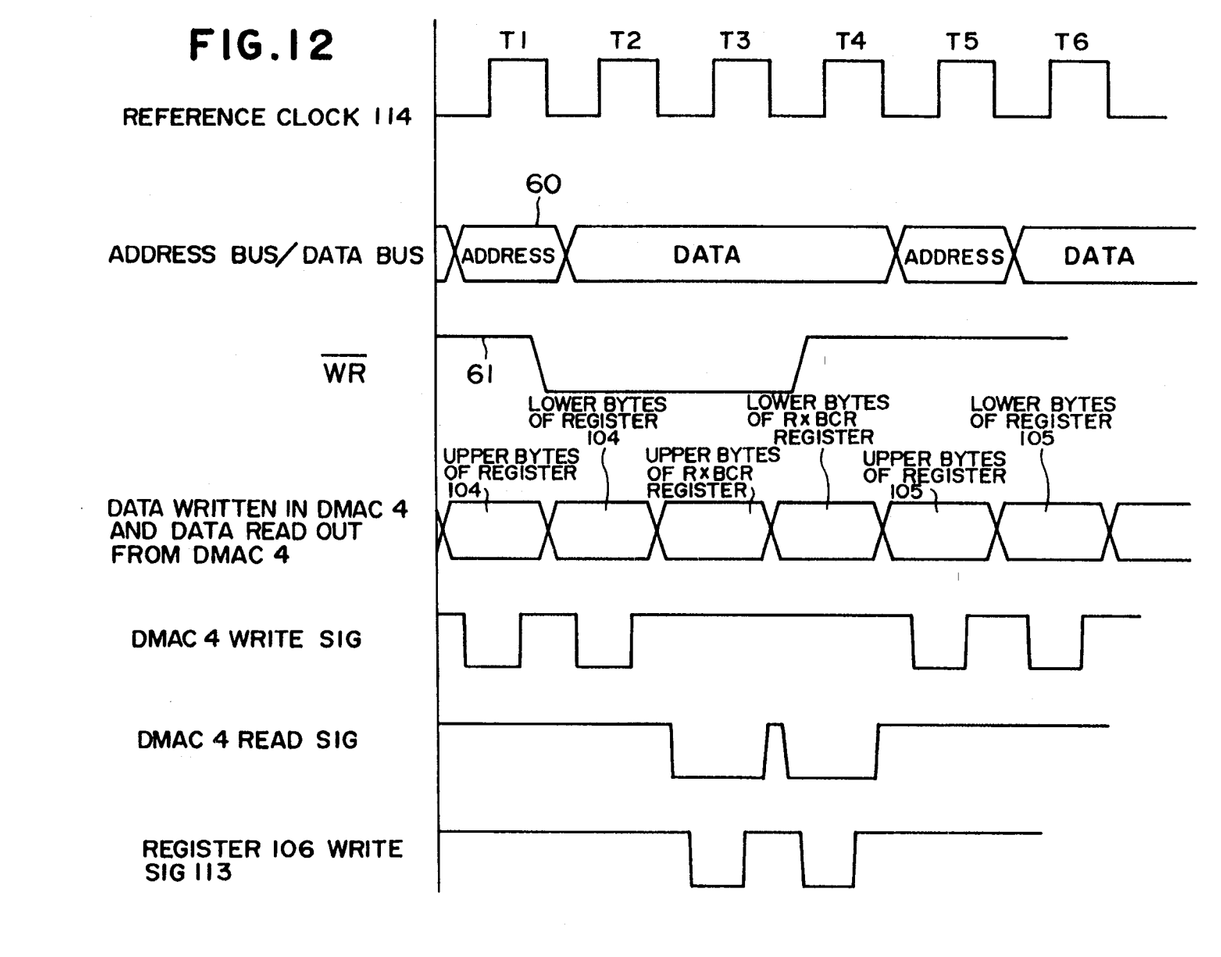
FIG. 12 is a timing chart illustrating write and read timings to and from the DMAC relative to the CPU operation.

FIG. 12 is a timing chart showing the operation of the reception frame control unit 6 relative to that of CPU 1.

A waveform 60 represents the basic timings of the address bus and the data bus, and a waveform 61 represents a write signal ($\overline{WR}$) output to the control bus 9 from CPU 1. As seen from the timing chart, in case of a conventional microprocessor, even if data to be written are set in the accumulator, it takes at least four cycle time of the reference clock 114 (for an I/O write instruction) to write the one byte data into each register of DMAC 4.

In contrast, in case of this embodiment, writing data of four bytes into DMAC 4 takes four clock cycle time of the reference clock 114, thus enabling to set parameters of DMAC 4 at high speed. Write and read signals to DMAC 4 are output to the control line 9 from the control circuit 100 at the timings shown in FIG. 12. The write signal 113 to the register 106 is output thereto from the control circuit 100 in synchronism with the read signal to DMAC 4.

Although setting data in the internal registers RxADR and RxBCR of DMAC 4 has been described in the present embodiment, the invention is not limited thereto, but virtual registers may be provided in the reception frame control unit 6 for all the internal write-enabled registers of DMAC 4 to effect writing data into the respective registers.

Further, DMA transfer for a communication apparatus has been described. However, the invention is not limited thereto, but it is also applicable to DMA transfer between a memory and an I/O unit of other apparatus. As described so far, the present embodiment allows the preparation of DMA transfer at high speed so that high speed consecutive communication frames can be reliably received. Further, the burden of parameter setting processing to be executed by CPU after the end of DMA transfer can be effectively lightened.

I claim:

1. An information system having a DMA function, said information system comprising:
   processing means;
   clock means for generating a basic clock and providing the basic clock to said processing means;
   DMA control means connected to a bus shared by said processing means, said DMA control means having present various parameters for DMA control;
   storage means for receiving and storing next various control parameters for next DMA control;
   addressing means for outputting an address of the next various control parameters to be set at said DMA control means; and
   means for outputting the next various control parameters from said storage means to said DMA control means in accordance with the basic clock generated by said clock means without the use of said processing means.

2. An information system according to claim 1, wherein outputting of the next various control parameters from said storage means to said DMA control means is performed by said outputting means without the use of said processing means.

3. An information system having a DMA function, said information system comprising:
   processing means for processing information;
   DMA control means having register means for receiving and storing present various control parameters for DMA control;
   storage means for receiving and storing various control parameters from said processing means; and
   setting means connected to said DMA control means for reading the next various control parameters from said storage means and setting the various control parameters at said DMA control means in response to the completion of DMA control based on the present various control parameters without the use of said processing means.

4. An information system according to claim 3, wherein reading of the various control parameters from said storage means to said DMA control means is performed such that the various control parameters are read from said storage means at a front half of one cycle of a reference clock and the various control parameters are written in said DMA control means at a back half of the one cycle.

5. An information system having a DMA function, said information system comprising:
   processing means for processing information;
   DMA control means having register means for receiving and storing present various control parameters for DMA control;
   storage means for receiving and storing next various control parameters for DMA control;
   setting means connected to said DMA control means for reading the next various control parameters from said storage means and setting the various control parameters at said DMA control means without the use of said processing means; and
   means for inhibiting the operation of said setting means prior to a renewal of various control parameters in said storage means.

6. An information system according to claim 5, wherein the various control parameters include at least both DMA transfer address information and a number of transfer words.

7. An information system according to claim 5, wherein DMA control information is transferred from said storage means to said DMA control means, and information resulting from the transfer is read from said DMA control means and stored in said storage means.

8. An information system according to claim 7, wherein at least one clock cycle of a reference clock of said DMA control means is used as a cycle time of said DMA control means or said storage means.

* * * * *